United States Patent
Howcroft (10) Patent No.: US 8,584,186 B2
(45) Date of Patent: Nov. 12, 2013

(54) METHOD AND APPARATUS TO PROVIDE SUPPLEMENTAL MEDIA CONTENT

(75) Inventor: Jerald Howcroft, Beverly Hills, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 487 days.

(21) Appl. No.: 12/273,001

(22) Filed: Nov. 18, 2008

(65) Prior Publication Data

US 2010/0125884 A1     May 20, 2010

(51) Int. Cl.
    *H04N 7/173*     (2011.01)
(52) U.S. Cl.
    USPC .......................................................... 725/93
(58) Field of Classification Search
    None
    See application file for complete search history.

(56) References Cited

U.S. PATENT DOCUMENTS

| | | | |
|---|---|---|---|
| 6,275,988 B1 * | 8/2001 | Nagashima et al. | 725/8 |
| 7,200,857 B1 * | 4/2007 | Rodriguez et al. | 725/87 |
| 2002/0019981 A1 * | 2/2002 | Schein et al. | 725/41 |
| 2002/0042920 A1 * | 4/2002 | Thomas et al. | 725/87 |
| 2008/0010342 A1 * | 1/2008 | Gebhardt et al. | 709/204 |
| 2008/0066100 A1 * | 3/2008 | Brodersen et al. | 725/35 |
| 2008/0066124 A1 * | 3/2008 | Igoe et al. | 725/81 |
| 2008/0155613 A1 * | 6/2008 | Benya et al. | 725/89 |
| 2008/0163304 A1 * | 7/2008 | Ellis | 725/50 |
| 2008/0235101 A1 | 9/2008 | Piepenbrink | |
| 2008/0276278 A1 * | 11/2008 | Krieger et al. | 725/40 |
| 2009/0158311 A1 * | 6/2009 | Hon et al. | 725/14 |
| 2009/0265359 A1 * | 10/2009 | Barsook et al. | 707/10 |
| 2010/0257569 A1 * | 10/2010 | O'Hanlon | 725/110 |

\* cited by examiner

*Primary Examiner* — Chenea Smith
(74) *Attorney, Agent, or Firm* — Toler Law Group, PC (57) ABSTRACT

Method and apparatus to provide supplemental media content are presented. In a particular embodiment, a method of providing supplemental content in a Video-On-Demand (VOD) system is provided. The method includes receiving a selection of a first supplemental content title selected from a plurality of supplemental content titles provided by a selectable menu, where each of the plurality of supplemental content titles is associated with a particular VOD offering. The selectable menu provided is to be displayed upon detection of discontinued transmission of the particular VOD offering. The method also includes providing first supplemental content associated with the first supplemental content title. The first supplemental content is accessible by a subscriber when the particular VOD offering is not being presented and wherein the first supplemental content is not accessible by the subscriber when the particular VOD offering is being presented.

25 Claims, 6 Drawing Sheets

Jerry's FAVORITE FLICKS LIST

1. Star Wars Episode 1
2. Movie 2
3. Movie 3

— 402

ACCESS to Jerry's FAVORITE FLICKS LIST

1. Mrs. Jerry H.
2. Geri H.
3. Jerald H. Jr.
4. J. Fox

STAR WARS PRODUCTS
- Select one or more items
- Select quantity of each item to purchase

ITEM | QUANTITY TO PURCHASE

Darth Vader mask@ $29.95  ———  — 502

Star Wars Mug @ $6.95  — 504  ———

Wookie Mask @$19.95  ———

C3PO Costume @$39.95  ———

R2D2 Costume @$39.95  ———

Star Wars collector card set @$2.95  ———

Total cost  ———
506

METHOD AND APPARATUS TO PROVIDE SUPPLEMENTAL MEDIA CONTENT

FIELD OF THE DISCLOSURE

The present disclosure is generally related to supplemental media content.

BACKGROUND

Media content presented via Video-On-Demand (VOD) may have associated supplemental media content such as a movie trailer or interview with the director. The supplemental media content may be offered to a subscriber prior to, or subsequent to presentation of the media content. The supplemental media content may be offered individually in serial fashion, so that the subscriber chooses to download or not to download a particular supplemental content offering, but the subscriber may not be aware of available choices of supplemental content before downloading the particular supplemental content offering.

DETAILED DESCRIPTION

In a particular embodiment, a method of providing supplemental content in a Video-On-Demand (VOD) system is provided. The method includes receiving a selection of a first supplemental content title selected from a plurality of supplemental content titles provided by a selectable menu, where each of the supplemental titles is associated with a particular VOD offering. The selectable menu is provided to be displayed upon detection of discontinued transmission of the particular VOD offering. The method also includes providing first supplemental content associated with the first supplemental content title. The first supplemental content is accessible by a subscriber when the particular VOD offering is not being presented, but the first supplemental content is not accessible by the subscriber when the particular VOD offering is being presented. For example, the first supplementary content may be offered after a VOD movie has been presented to the subscriber.

In another particular embodiment, a set-top box (STB) provides supplemental content in a Video-On-Demand (VOD) system. The STB includes a processor and a memory coupled to the processor. The memory stores a menu module to provide a selectable menu including a plurality of selectable supplemental content titles associated with a particular VOD offering, where the menu is provided to be displayed upon detection of discontinued transmission of the particular VOD offering. The memory also stores a selection module to receive a subscriber selection of a first supplemental content title selected from the selectable menu and to retrieve first supplemental content associated with the first supplemental content title. The first supplemental content is accessible by a subscriber when the particular VOD offering is not being displayed, but the first supplemental content is not accessible by the subscriber when the VOD offering is being displayed.

In another particular embodiment, a Video Distribution Network (VDN) server is provided. The VDN server includes a processor to receive input indicating a selection of a first supplemental content title associated with a particular Video-on-Demand (VOD) offering. The first supplemental content title is selected from a plurality of selectable supplemental content titles associated with the particular VOD offering. The selectable menu is provided to be displayed upon detection of discontinued transmission of the particular VOD offering. In a particular illustrative embodiment, the VDN can trigger providing the menu to be displayed. The processor is further to retrieve first supplemental content associated with the first supplemental content title and to provide the first supplemental content via a network.

In another particular embodiment, the Video Distribution Network (VDN) server provides the first supplemental content to the set-top box (STB) via an Internet Protocol Television (IPTV) network.

In another particular embodiment, a computer-readable medium stores processor-executable instructions that when executed, cause the processor to receive a subscriber selection of a first supplemental content title selected from a plurality of supplemental content titles provided by a selectable menu to be displayed upon detection of discontinued transmission of a particular Video-on-Demand (VOD) offering, where each of the supplemental content titles is associated with the particular VOD. The processor-executable instructions additionally cause the processor to provide first supplemental content associated with the first supplemental content title.

Figure 1:
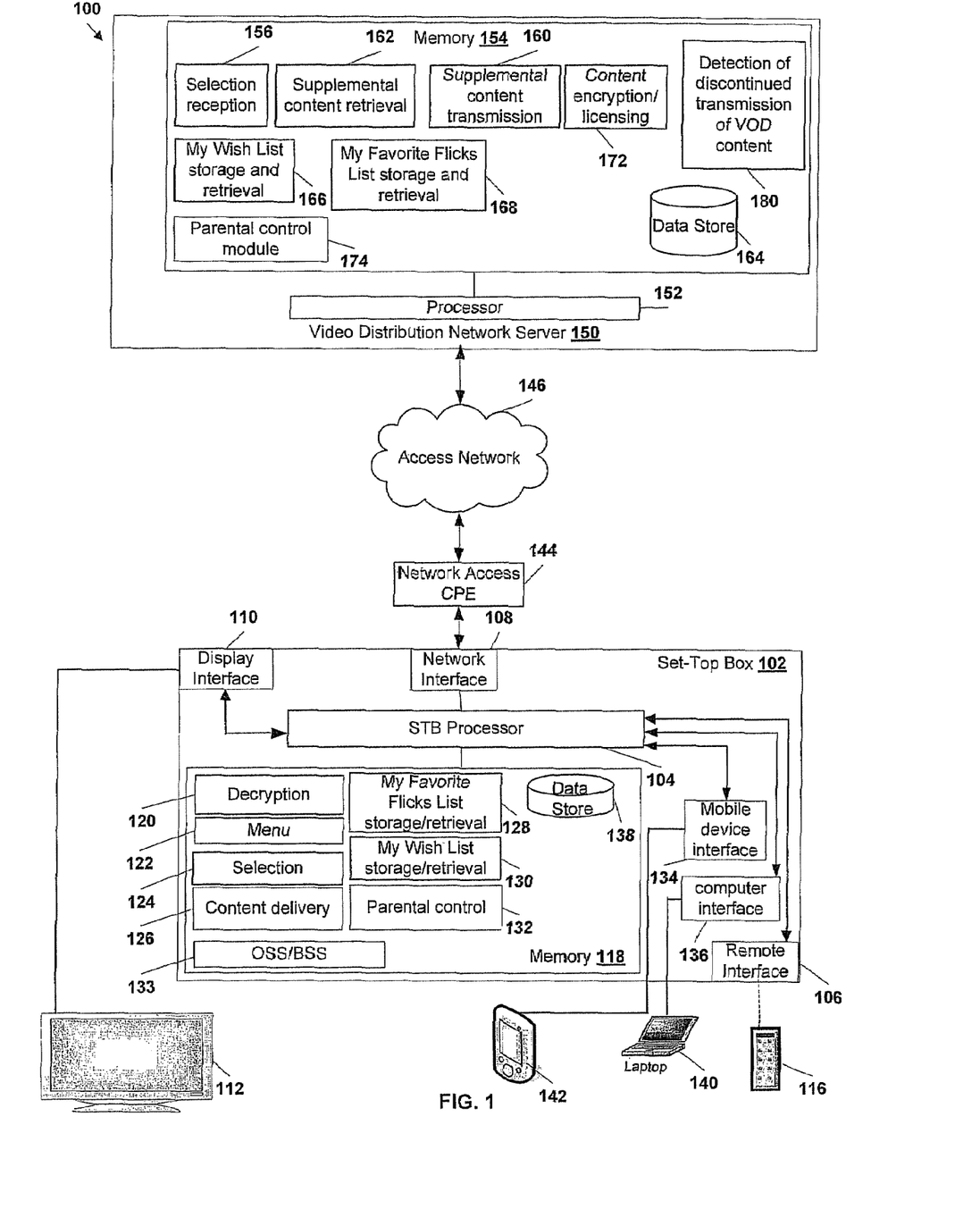
FIG. 1 is a block diagram of a first embodiment of a system to provide supplemental content.

FIG. 1 is a block diagram of a first embodiment of a system to provide supplemental video content. The system 100 includes a set-top box 102, network access customer premises equipment (CPE) 144, an access network 146, and a video distribution network (VDN) server 150. The set-top box 102 includes a network interface 108, a set-top box processor 104, and a memory 118. In a particular illustrative embodiment, the access network 146 is an Internet Protocol Television (IPTV) network, a cable network, another network, or any combination thereof.

The set-top box (STB) processor 104 is coupled to a display interface 110, to a remote interface 106, to the network interface 108, and to the memory 118. The display interface 110 is coupled to a display device 112. Optionally a personal digital assistant (PDA) 142 or another mobile device (not shown) is coupled to the STB 102 via a mobile device interface 134. Optionally a laptop computer 140 is coupled to the set-top box 102 via a computer interface 136. A remote control 116 may be coupled to the set-top box via the remote interface 106.

The STB 102 may be coupled to the access network 146 via the network access CPE 144. The VDN server 150 may also be coupled to the access network 146. The VDN server 150 includes a VDN processor 152 and a memory 154 that is coupled to the VDN processor 152.

In a particular illustrative embodiment, the set-top box (STB) 102 receives a selection of a particular video offering (also a particular VOD offering herein) to be displayed, where the selection is initiated by a subscriber. The STB 102 requests the selected video content via the network access CPE 144 and the access network 146 to the VDN server 150, and the STB 102 subsequently receives the particular VOD offering. The STB processor 104 invokes a content delivery module 126 to display the particular VOD offering on a display device such as the video display 112.

In a particular illustrative embodiment, the STB 102 provides a selectable menu of supplemental content titles, and the menu is displayed upon detection of discontinued transmission of the particular VOD offering. For example, the menu may be displayed prior to receiving a transmission of the particular VOD offering or after receiving the transmission of the particular VOD offering. In a particular illustrative embodiment, the STB 102 receives notification of detection of discontinued transmission of the particular VOD offering generated by the VDN server 150. The notification can be generated by the processor 152 executing a Detection of discontinued transmission of VOD content module 180 stored in the memory 154 of the VDN server 150. In another particular illustrative embodiment, the STB 102 may detect the discontinued transmission of the particular VOD offering by the STB processor 104 executing a Detection of discontinued transmission of VOD content module (not shown) that may be stored in the memory 118. The menu can include one or more selectable supplemental content offerings. For example, the menu may include supplemental content offerings related to the particular VOD offering currently displayed, to be displayed, or previously displayed. Examples of supplemental content offerings include a game related to the VOD content, an interview with the director of the VOD content, an interview with a character appearing in the VOD content, a movie trailer, selected deleted scenes, selected scenes, a sub-menu of available products for purchase, a "my favorite" videos list, a video wish list, an alternate ending, other supplemental video content, or any combination thereof. The STB 102 may provide the menu to the video display 112 by invoking a menu module 122 that is stored in the memory 118. In a particular illustrative embodiment, each of the supplemental content offerings having a supplemental content title in the selectable menu is available to a subscriber without an additional cost associated with the supplemental content offering being charged to the subscriber. In a particular illustrative embodiment, a subscriber enters a selection of one of the selectable offerings of supplemental content. For example, the subscriber selection may be received via a remote device coupled to the STB 102, such as the PDA 142, the laptop 140, the remote control 116, or via another remote device (not shown). The STB 102 may receive the subscriber selection and may request the selected supplemental content from the VDN server 150 via the access network 146. The STB 102 may then receive the requested supplemental content and display the supplemental content on the video display 112, the laptop 140, the PDA 142, or on another display device (not shown). In a particular illustrative embodiment, the access network 146 is a cable network, and the STB 102 receives the selected supplemental content via the cable network. In another particular illustrative embodiment, the access network 146 is an Internet Protocol Television (IPTV) network, and the STB 102 receives the selected supplemental content via the IPTV network.

In a particular illustrative embodiment, when the STB 102 receives the selection originated by the subscriber, the STB 102 formulates a request to receive the selected supplemental content, invoking the selection module 124 that resides in the memory 118. When the selected supplemental content is received at the STB 102, the STB 102 delivers the selected supplemental content to a display device, invoking a content delivery module 126 residing in the memory 118. For example, the STB processor 104 retrieves the selected supplemental content and delivers the supplemental content to a requested delivery device, such as the video display 112, the PDA 142, the laptop 140, a mobile device (not shown), another device (not shown) or any combination thereof. In a particular illustrative embodiment, the subscriber is not charged any additional fee to download, have delivered or view the selected supplemental content.

In a particular illustrative embodiment, the subscriber selects supplemental content that requires that a subscriber obtain a license in order to enable access. The subscriber obtains the license through e.g., purchase of license rights, or by satisfying other licensing requirements. Once acquired, the license enables the subscriber to access the supplemental content, such as by decrypting supplemental content that has been encrypted. For example, the license can provide the subscriber with a decryption key, enabling a decryption module 120, residing in the memory 118 of the STB 102 and accessible by the STB processor 104, to decrypt the supplemental content.

In a particular illustrative embodiment, the supplemental content includes a parental control, enabling a parent to permit or deny access by a child to the VOD content, or to other supplemental content. The STB processor 104 may enable the parental control utilizing a parental control module 132 residing in the memory 118.

Other supplemental content may include a "my favorite flicks" list, which enables the subscriber to add his/her favorite video content to the subscriber's personally accessible list. The list can be stored in a data store 138 of the memory 118 and may be accessed using a "my favorite flicks" list storage/retrieval module 128 residing in the memory 118.

In a particular illustrative embodiment, a request of supplemental content at the STB 102 causes an operations support systems/business support systems module (OSS/BSS) 133 to be invoked, which resides in the memory 118. In a particular illustrative embodiment, the OSS/BSS module 133 checks a subscriber's profile to determine if the supplemental content requested is to be provided without charge or is to be accompanied by a charge, based at least in part on the subscriber's particular subscription plan. The OSS/BSS module 133 may also be invoked to determine if there are other business rules that apply to the subscriber requesting the supplemental content.

In another particular illustrative embodiment, the supplemental content is a "my wish list" that includes a list of the subscriber's favorite videos. The subscriber may access his or her "my wish list," which can be stored in the data storage 138, by the STB processor 104 invoking a "my wish list" storage/retrieval module 130 residing in memory 118.

In another particular embodiment, the VDN server 150 may provide a particular VOD offering to the STB 102. The VDN server 150 may notify the STB 102 of detection of discontinued transmission of the particular VOD offering. The notification can be generated by the processor 152 after executing a Detection of discontinued transmission of VOD content module 180 stored in the memory 154 of the VDN server 150. Subsequently, the VDN server 150 may provide a plurality of selectable supplemental content titles associated with the particular VOD offering in a selectable menu. In a particular illustrative embodiment, the menu is provided to be displayed upon detection of discontinued transmission of the particular VOD offering. For instance, the menu may be provided prior to transmission of the particular VOD offering or subsequent to transmission of the particular VOD offering.

The VDN server 150 may receive input indicating a selection of one of the supplemental content titles. The VDN server 150 retrieves the selected supplemental content associated with the selected supplemental content title from e.g., a data store 164 in the memory 154, or from another source that may be accessible via the access network 146. The VDN server 150 provides the selected supplemental content via the access network 146 to the STB 102. In a particular illustrative embodiment, each of the supplemental content offerings having a supplemental content title in the selectable menu is transmitted or otherwise made available to a subscriber without additional cost to the subscriber.

The VDN processor 152 may invoke a selection reception module 156 residing in the memory 154 to receive the selection of the supplemental content title generated from the set-top box 102 and received by the access network 146. The VDN processor 152 may retrieve the selected supplemental content, invoking a content retrieval module 162 within the memory 154 to locate and retrieve the selected supplemental content. The VDN processor 152 may transmit the selected supplemental content to the STB 102 via the access network 146 by invoking a supplemental content transmission module 160 residing in the memory 154.

In a particular illustrative embodiment, the selected supplemental content is made available to the subscriber during a predetermined time period after the particular VOD content has been presented. For instance, the subscriber may access the selected supplemental content at any time during a two week period following presentation of the particular VOD content.

In a particular illustrative embodiment, the supplemental content request includes a parental control request, a request for a licensed product, access to a "my favorite flick" list, access to "my wish list", other supplemental content, or any combination thereof. The VDN processor 152 accesses a module residing in the memory 154 to retrieve and/or to enable the requested supplemental content. For instance, the VDN processor 152 may enable parental control by invoking a parental control module 174. The VDN processor 152 may enable granting of a license to a subscriber requesting the license associated with supplemental content.

In a particular illustrative embodiment, the VDN processor 152 encrypts the supplemental content. Encryption and/or licensing to decrypt the content is handled by the VDN processor 152 by invoking a content encryption/licensing module 172. The VDN processor 152 may also supply a license and can provide information, such as a decryption key to enable the encrypted supplemental content to be decrypted at the STB 102.

In another particular illustrative embodiment, a request for "my wish list" retrieval is fulfilled by the VDN processor 152 by invoking a "my wish list" storage and retrieval module 166. The VDN processor 152 may also enter a selection of a VOD content title received from a subscriber into a subscriber wish list, which is a "my wish list" assigned to the subscriber, where the VOD title is associated with a VOD content offering. The subscriber wish list can be stored in the data store 164 or within the access network 146, which may be an IPTV access network, or at another storage device.

In another particular illustrative embodiment, the first supplemental content includes a recommendation form enabling the subscriber to enter a subscriber recommendation associated with the particular VOD offering. In a particular illustrative embodiment, the subscriber recommendation is available to be viewed by a selected set of other subscribers. In another particular illustrative embodiment, the subscriber recommendation is available to be viewed by all subscribers.

In another particular illustrative embodiment, a subscriber request to retrieve a "my favorite flicks" list specific to the subscriber may be fulfilled by the VDN processor 152 by invoking a "my favorite flicks" list storage and retrieval module 168. The VDN processor 152 may also enter a selection of VOD content title received from a subscriber into a subscriber favorites list, which is a "my favorite flicks" list associated with the subscriber. The subscriber favorites list can be stored in the data store 164 or within the access network 146, which may be an IPTV access network, or at another storage device.

In a particular illustrative embodiment, other supplemental content may be retrieved and provided through the use of additional modules (not shown). In a particular illustrative embodiment, one or more additional modules are retrievable from the memory 154 or from another source.

Figure 2:
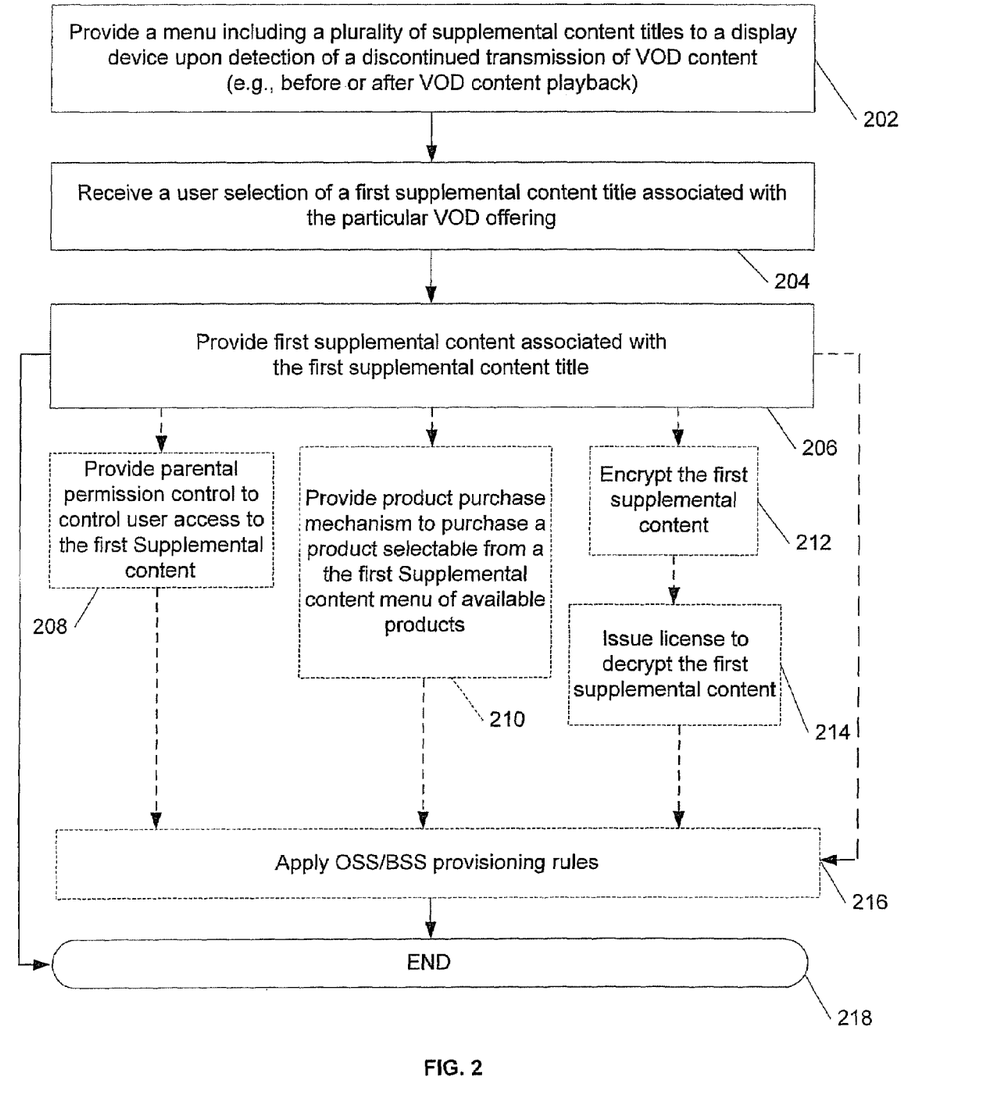
FIG. 2 is a flow diagram of an embodiment of a method to provide supplemental content.

FIG. 2 is a flow diagram of an embodiment of a method to provide supplemental video content. At block 202, a menu is provided including a plurality of selectable supplemental content titles associated with a particular Video-On-Demand (VOD) offering. For example, the supplemental content titles may include titles of one or more games related to the VOD offering, a movie trailer, or other titles of supplemental content related to the particular VOD offering. The menu is provided upon detection of discontinued transmission of the particular VOD offering, e.g., prior to or subsequent to transmission of the particular VOD offering. In a particular illustrative embodiment, each of the supplemental content offerings whose supplemental content title is in the selectable menu is available to a subscriber without additional cost to the subscriber. That is, the subscriber that has chosen a particular VOD offering to download will not be charged additionally to receive any item listed on the selectable menu.

Proceeding to block 204, a user selection of a supplemental content title associated with the particular VOD offering is received. Moving to block 206, the supplemental content associated with the supplemental content title is provided. In a particular illustrative embodiment, the supplemental content is accessible by a subscriber when the VOD offering is not being presented to the subscriber, but the supplemental content is not accessible by the subscriber when the particular VOD offering is being presented to the subscriber. For example, the supplemental content is accessible by a subscriber prior to presentation of the particular VOD offering or subsequent to the presentation of the particular VOD offering. In a particular illustrative example, the supplemental content is provided through a cable network. In another particular illustrative example, the supplemental content is provided through an Internet Protocol Television (IPTV) network.

Blocks 208, 210, 212, 214, and 216 are optional and may be skipped to advance to block 218. At block 208, a parental permission control is optionally provided, enabling a parent to control access by a child to the supplemental content. At block 210, a purchase mechanism is optionally provided, enabling a subscriber to purchase a product selectable from a menu of available products associated with the particular VOD offering. At block 212, the supplemental content is optionally encrypted. For example, by encrypting the supplemental content, digital rights management can be enforced. Decrypting the supplemental content can be enabled after obtaining an appropriate license. At block 214, a license is optionally issued in order to decrypt the supplemental content that has been encrypted. In a particular illustrative example, decrypting occurs at a receiving set-top box (STB).

At block 216, operations support systems/business support systems (OSS/BSS) provisioning rules are optionally applied to the supplemental content. For example, a pricing scheme associated with the supplemental content is applied and presented to the requesting subscriber. In a particular illustrative example, the OSS/BSS provisioning rules provide the requested supplemental content without charge to a subscriber on a particular subscription plan. In another particular example, the requested supplemental content has a charge associated with it. For example, in order to access a game associated with the particular VOD content, a subscriber account can be charged accordingly. The method ends at block 218.

Figure 3:
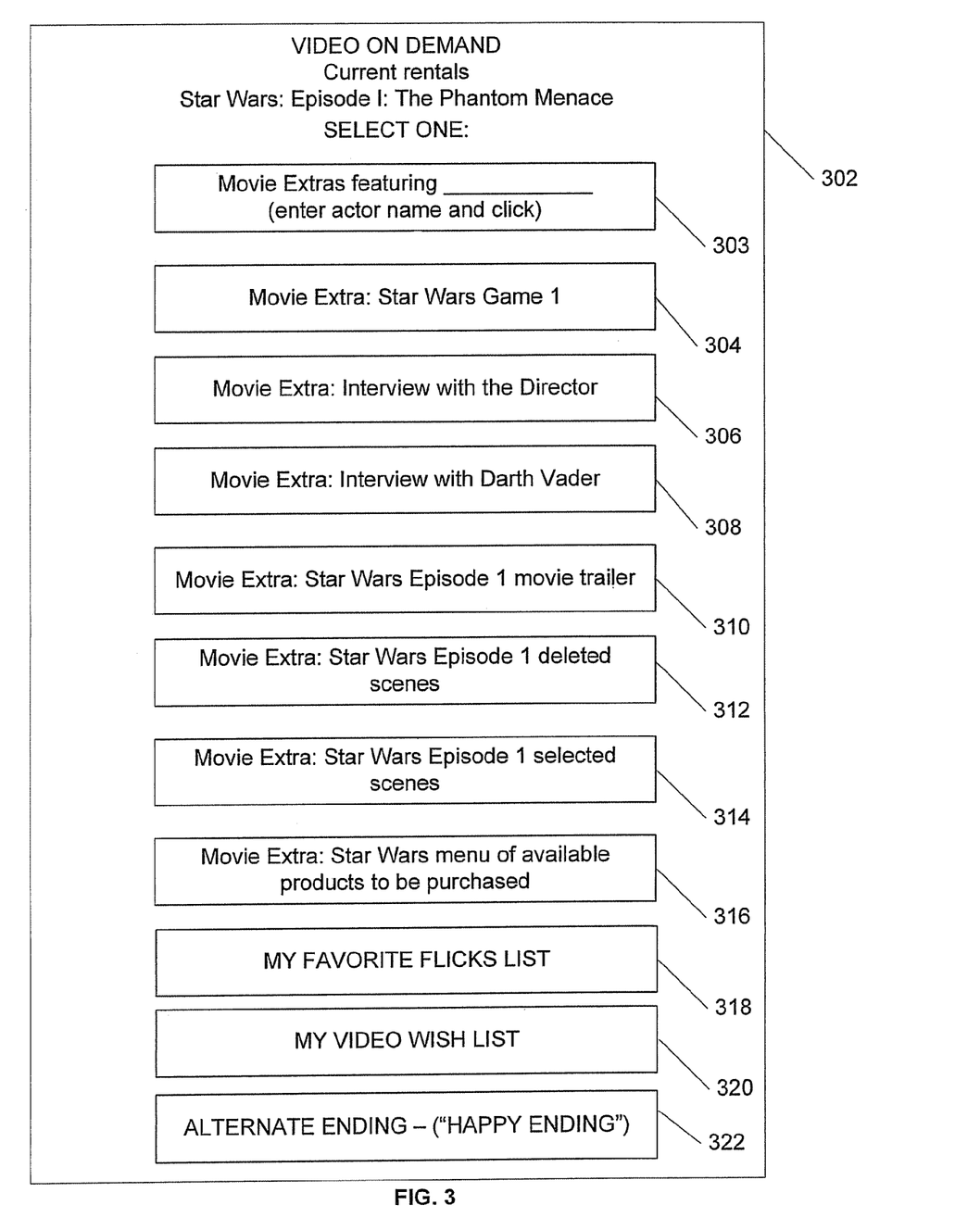
FIG. 3 is an illustrative embodiment of a selectable menu of supplemental content options.

FIG. 3 is an illustrative embodiment of a selectable menu 302 that includes a plurality of selectable supplemental content titles. In a particular illustrative embodiment, the menu is provided to be displayed upon detection of discontinued transmission of a particular Video on Demand offering, such as before a transmission of the VOD offering or subsequent to the transmission of the VOD offering (e.g., after the end of a movie or program). In a particular illustrative example, a particular Video-On-Demand (VOD) offering entitled "Star Wars Episode 1—The Phantom Menace" is available to a subscriber. The selectable menu 302 includes a plurality of selectable buttons, each button associated with a particular supplemental content title. For example, button 303 enables a subscriber to view available movie extras that feature an actor who is identified by inserting the actor's name into a blank portion of the selectable button 303. Selecting the button 303 after inserting the actor's name can cause a secondary menu to pop-up that includes a selectable list of available supplemental content titles associated with the particular actor. Other selectable buttons can include, but are not limited to: button 304, enabling the subscriber to play a "Star Wars Game Number 1"; button 306, providing an interview with the director; button 308, providing an interview with movie character Darth Vader; button 310, providing a "Star Wars Episode 1" movie trailer; button 312, providing "Star Wars Episode 1" deleted scenes; button 314, providing "Star Wars Episode 1" selected scenes; button 316, providing a menu of products that can be purchased; button 318, providing a "my favorite flicks list"; button 320, providing the subscriber with a "my video wish list"; and button 322, providing to the subscriber an alternate ending, such as a "happy ending."

In a particular embodiment, the menu 302 may be linked to one or more other screens. In a particular illustrative example, a subscriber inserts a particular actor's name and selects button 303, which produces in another pop-up screen (not shown) displaying a listing of selectable supplemental video content offerings, such as movie clips featuring the particular actor. The subscriber can select particular supplemental video content within the pop-up screen.

In another particular illustrative example, the subscriber selects button 304 to request a "Star Wars Game 1" item, which triggers a secondary screen (not shown) indicating an availability of other games related to Star Wars movies. In a similar fashion, when the subscriber selects any of the buttons shown in the menu 302, a secondary screen (e.g., "pop-up") can be automatically displayed or can be presented after selecting another selectable button, providing additional supplemental content or related items of interest. For example, when the subscriber selects "Star Wars Game 1" button 304, a pop-up window can provide the subscriber an opportunity to upgrade his or her subscription in order to include a selection of one or more games. In another particular illustrative example, the menu 302 includes a movie recommendation to a friend or to a family member.

In another particular illustrative example, digital rights associated with particular supplemental content may be preserved by instructing the subscriber to indicate a willingness to comply with a licensing formality. For example, the subscriber may be asked to check a soft-box indicating an agreement by the subscriber not to reproduce the game or to provide access to the game by any person other than the subscriber. In another particular example, an OSS/BSS rule or rules may be applied to a VOD content offering or to a supplemental content offering.

In a particular illustrative embodiment, each of the selectable buttons in the menu 302 provides associated supplemental content to the subscriber during times when the main VOD content is not accessible to the subscriber. Thus, for example, selecting button 310 enables the subscriber to watch the "Star Wars Episode 1" movie trailer prior to, or subsequent to watching the VOD presentation of "Star Wars Episode 1." In another particular illustrative example, selecting button 322 causes the alternate ending ("happy ending") to be available to the subscriber after the subscriber has watched the VOD offering of "Star Wars Episode 1."

Figure 4:
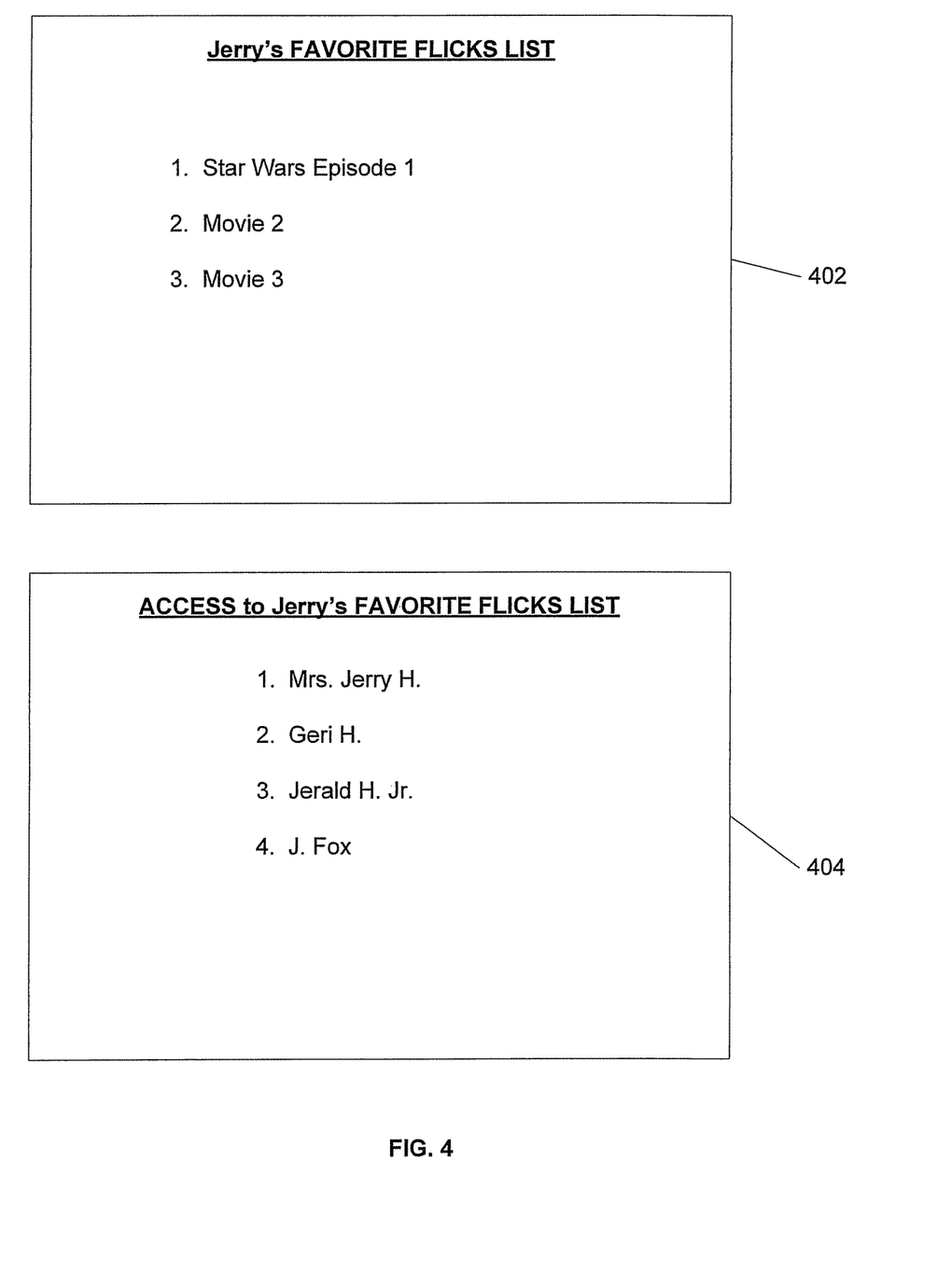
FIG. 4 is an illustrative embodiment of a supplemental content offering.

FIG. 4 is an illustrative embodiment of a particular supplemental video content feature, a My Favorite Flicks list 402. For example, Jerry's Favorite Flicks List is associated with subscriber Jerry. In a particular illustrative embodiment, a subscriber may select the button 318 as shown in FIG. 3, which causes the My Favorite Flicks list 402 associated with the subscriber to be displayed on a display device. The subscriber may add or delete movies in his/her personal My Favorite Flicks list 402, which may be identified by the subscriber's name in a list title 403. The subscriber can change listings in the subscriber's My Favorite Flicks List, and no other subscribers or users may change the listing in the subscriber's My Favorite Flicks List.

In a particular illustrative example, the subscriber enters an access list of people who are entitled to view the subscriber's My Favorite Flicks List. The subscriber (Jerry) can create an access list 404 including people who are entitled to view the subscriber's My Favorite Flicks List. For example, the access list 404 identifies family members who can access Jerry's Favorite Flicks List 402, which can serve as Jerry's gift wish list.

Figure 5:
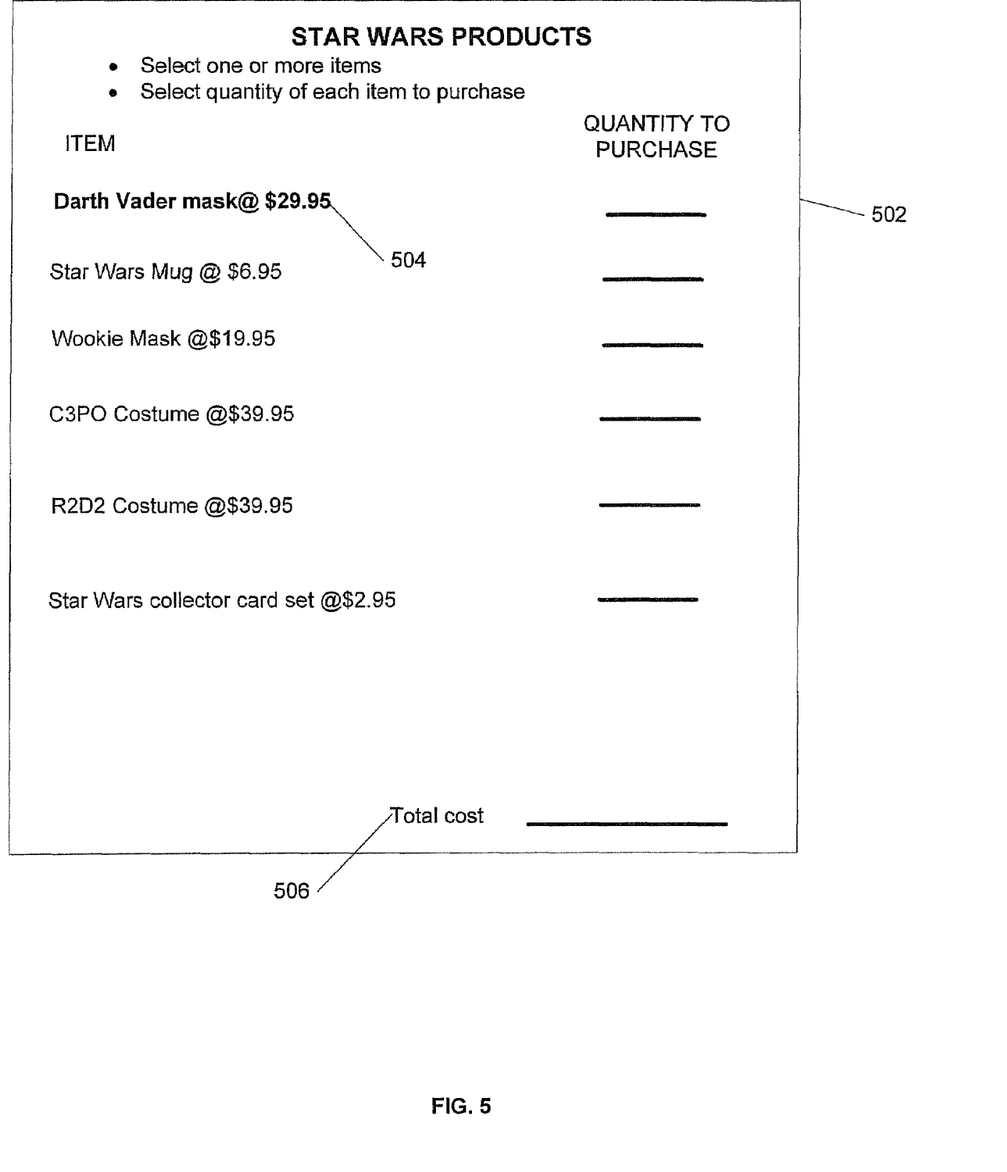
FIG. 5 is a diagram of a selectable menu of products associated with video content.

FIG. 5 is an illustrative embodiment of supplemental content that includes a selectable order form 502 of products associated with Video-On-Demand (VOD) content. The order form 502 lists a plurality of items on sale, each of the items associated with the VOD content that is available to be viewed by the subscriber. For example, the order form 502 includes a plurality of items related to a "Star Wars" movie that is accessible by the subscriber. The subscriber is instructed to highlight each item of interest and to enter a quantity desired. For example, Darth Vadar masks may be ordered by highlighting a line item 504 and entering the quantity desired. In a particular example, a program executed by the processor calculates a total cost 506 associated with the purchase. In a particular illustrative example, when the subscriber has completed his or her order, a subsequent supplemental screen (not shown) can complete the purchase via credit card or another financial instrument to complete the transaction.

In a particular embodiment, the supplemental content offerings are provided through an Internet Protocol Television (IPTV) network. In another particular illustrative embodiment, supplemental video content offerings may be supplied through another network, such as a cable network. In a particular illustrative embodiment, the supplemental video content is delivered via the cable network and is accessible to a subscriber when the subscriber is not accessing the video content of the main presentation. In another particular illustrative embodiment, the supplemental video content is delivered by a combination of an IPTV network, a cable network, and/or other networks.

Figure 6:
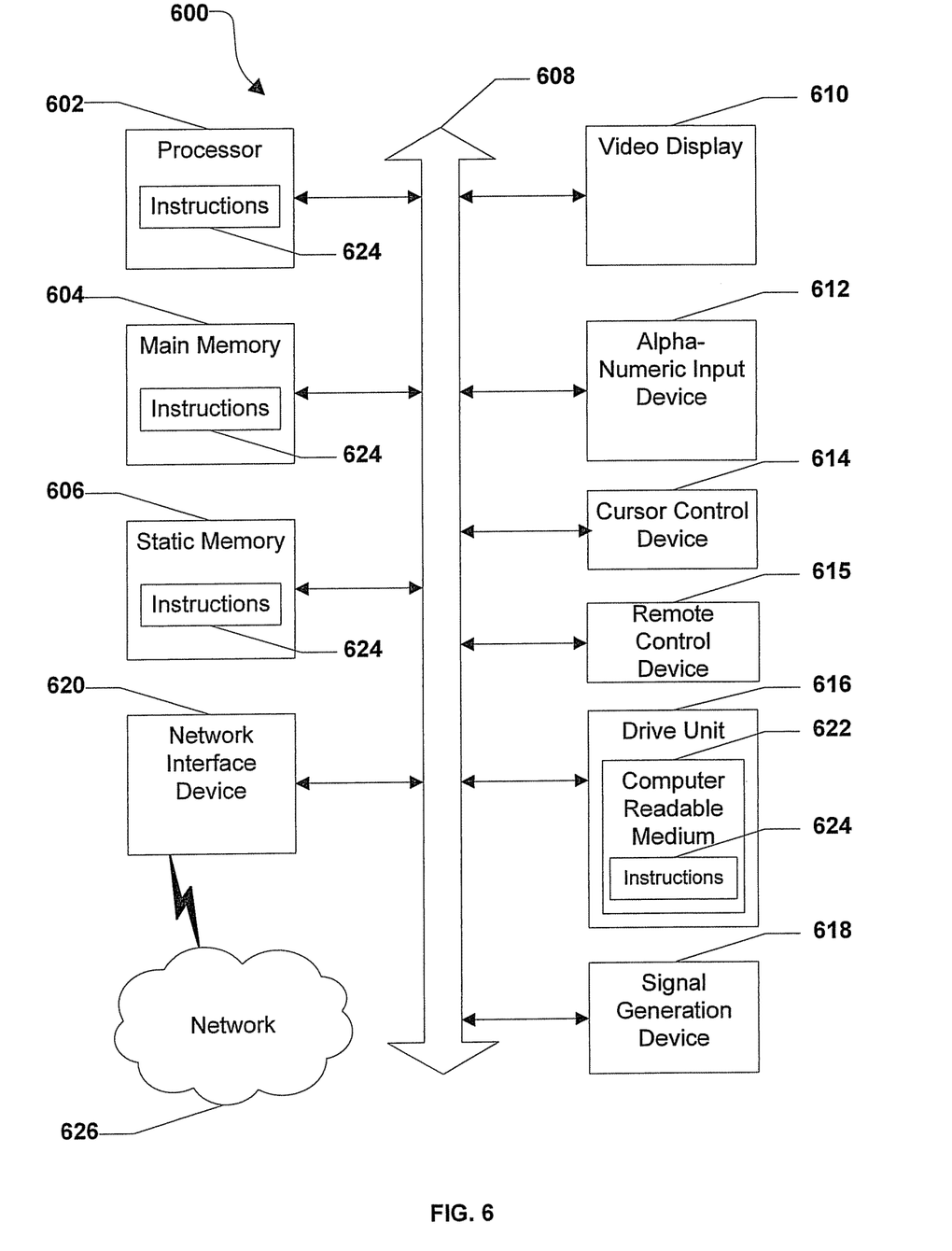
FIG. 6 s a general diagram of a particular illustrative embodiment of a computer system.

FIG. 6 is a general diagram of a particular illustrative embodiment of a computer system 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems, or peripheral devices, including a Telephone Number Mapping (ENUM) server, a Home Subscriber Server (HSS), components of an Internet Protocol Multimedia System (IMS), or originating and destination devices, as shown in FIGS. 1-4.

In a networked deployment, the computer system may operate in the capacity of a content source, a network management system, a server, set-top box device, or network switch. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, which can communicate with each other via a bus 608. As shown, the computer system 600 may further include a video display unit 610, such as a liquid crystal display (LCD), a flat panel display, a solid state display, a plasma display device, a video projector, or a cathode ray tube (CRT). Additionally, the computer system 600 may include an input device 612, such as a keyboard, a cursor control device 614, such as a mouse, and a remote control device 615. The computer system 600 can also include a disk drive unit 616, a signal generation device 618 such as a speaker, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile memories. Further, the computer-readable medium can be a random access memory or other volatile re-writable memory. Additionally, the computer-readable medium can include a magneto-optical or optical medium, such as a disk or tape or other storage device to capture carrier wave signals such as a signal communicated over a transmission medium. A digital file attachment to an e-mail or other self-contained information archive or set of archives may be considered a tangible storage medium. Accordingly, the disclosure is considered to include any one or more of a computer-readable medium or other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP), video standards (e.g., MPEG-2, MPEG-4, H.262, AVC, AVS), and encryption standards (e.g., AES, DES) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing supplemental content in a video-on-demand system, the method comprising:
   receiving, at a set-top box from a server, a transmission of video content of a selected video-on-demand offering for display on a display device coupled to the set-top box;
   sending, to the display device from the set-top box, a selectable menu of supplemental content titles associated with the selected video-on-demand offering in response to receipt of a notification from the server of discontinuation of the transmission of the video content to the set-top box;
   receiving, at the set-top box, a selection of a first supplemental content title selected from the supplemental content titles of the selectable menu;
   retrieving encrypted supplemental content associated with the first supplemental content title at the set-top box;
   decrypting, via the set-top box, the encrypted supplemental content to produce first supplemental content;
   receiving, at the set-top box, a selection of a second display device other than the display device for display of the first supplemental content; and
   sending the first supplemental content from the set-top box to the second display device,
   wherein a subscriber's profile is checked to determine if the supplemental content selected is to be provided without charge or is to be accompanied by a charge, based at least in part on the subscriber's particular subscription plan.

2. The method of claim 1, wherein the notification is received by the set-top box before an end of the video content is displayed.

3. The method of claim 1, further comprising entering a selection of a video-on-demand content title into a wish list, wherein the video-on-demand title is associated with a video-on-demand content offering.

4. The method of claim 1, further comprising entering a selection of a video-on-demand content title received from a user into a favorites list.

5. The method of claim 1, further comprising providing the first supplemental content via a cable network.

6. The method of claim 1, further comprising sending a second selectable menu of the supplemental content titles to the display device after selection of the selected video-on-demand offering and before receiving the video content at the set-top box.

7. The method of claim 1, wherein the supplemental content is provided without charging an additional fee.

8. The method of claim 1, further comprising displaying a subset of the supplemental content titles in a secondary menu, wherein each supplemental content title of the subset is associated with a first movie actor that has been selected by a user.

9. The method of claim 1, wherein the second display device comprises a mobile device.

10. The method of claim 1, wherein the second display device comprises a laptop computer.

11. A set-top box to provide supplemental content in a video-on-demand system, the set-top box comprising:
   a processor; and
   a memory coupled to the processor, the memory storing instructions executable by the processor to perform operations including:
   receiving a transmission of video content of a selected video-on-demand offering;
   sending a selectable menu comprising a plurality of selectable supplemental content titles that are associated with the selected video-on-demand offering in response to receipt of a notification from a server of discontinuation of the transmission of the video content;
   receiving a subscriber selection of a first supplemental content title selected from the selectable menu; and
   retrieving retrieve first supplemental content associated with the first supplemental content title, wherein the first supplemental content is accessible via the set-top box when the selected video-on-demand offering is not being presented via the set-top box and wherein the first supplemental content is not accessible via the set-top box when the selected video-on-demand offering is being presented via the set-top box,
   wherein a subscriber's profile is checked to determine if the supplemental content selected is to be provided without charge or is to be accompanied by a charge, based at least in part on the subscriber's particular subscription plan.

12. The set-top box of claim 11, wherein a second selectable menu comprising the plurality of supplemental content titles is sent to a display device after selection of the selected video-on-demand offering and before the set-top box receives the video content corresponding to the selected video-on-demand offering.

13. The set-top box of claim 11, wherein the first supplemental content is provided without charging an additional fee.

14. The set-top box of claim 11, wherein the first supplemental content includes an interactive game.

15. The set-top box of claim 11, wherein the first supplemental content includes an interview with a director of the selected video-on-demand offering.

16. A video distribution network server comprising:
a processor to execute instructions to perform operations including:
receiving selection of a particular video-on-demand offering from a set-top box;
transmitting video content of the particular video-on-demand offering to the set-top box;
detecting discontinuation of transmission of the video content to the set-top box;
sending a notification to the set-top box that the video distribution network server discontinued transmission of the video content to the set-top box;
receiving input indicating a selection of a first supplemental content title associated with the particular video-on-demand offering, wherein the first supplemental content title is selected from a menu sent to a display device by the set-top box in response to the notification, wherein the menu comprises a plurality of selectable supplemental content titles associated with the particular video-on-demand offering;
retrieving first supplemental content associated with the first supplemental content title; and
providing the first supplemental content via a network, wherein the first supplemental content is accessible via the set-top box when the particular video-on-demand offering is not being presented via the set-top box, and wherein the first supplemental content is not accessible via the set-top box when the particular video-on-demand offering is being presented via the set-top box, and
wherein a subscriber's profile is checked to determine if the supplemental content selected is to be provided without charge or is to be accompanied by a charge, based at least in part on the subscriber's particular subscription plan.

17. The video distribution network server of claim 16, wherein the first supplemental content includes an alternate ending associated with the particular video-on-demand offering.

18. The video distribution network server of claim 16, wherein the first supplemental content is made available during a predetermined time period after the particular video-on-demand content has been presented.

19. The video distribution network server of claim 16, wherein the operations further include encrypting the first supplemental content.

20. The video distribution network server of claim 16, wherein the operations further include providing a license associated with the first supplemental content to the set-top box.

21. A computer-readable storage device comprising processor-executable instructions that when executed by a processor, cause the processor to perform operations including:
transmitting video content of a selected video-on-demand offering to a set-top box;
detecting discontinuation of transmission of the video content to the set-top box;
sending a notification to the set-top box of discontinuation of the transmission to the set-top box;
receiving a subscriber selection of a first supplemental content title selected from a plurality of supplemental content titles provided by a selectable menu sent to a display device by the set-top box in response to the notification; and
providing first supplemental content associated with the first supplemental content title, wherein the first supplemental content is accessible via the set-top box when the selected video-on-demand offering is not being presented via the set-top box, and wherein the first supplemental content is not accessible when the selected video-on-demand offering is being presented via the set-top box,
wherein a subscriber's profile is checked to determine if the supplemental content selected is to be provided without charge or is to be accompanied by a charge, based at least in part on the subscriber's particular subscription plan.

22. The computer-readable storage device of claim 21, wherein the first supplemental content includes a recommendation form enabling entry of a recommendation associated with the selected video-on-demand offering.

23. The computer-readable storage device of claim 21, wherein the first supplemental content is provided to a mobile device.

24. The computer-readable storage device of claim 21, wherein the first supplemental content is provided to a personal computer.

25. The computer-readable storage device of claim 21, wherein the first supplemental content includes a parental permission control, and wherein user access to the first supplemental content is controlled at least in part by the parental permission control.

* * * * *